United States Patent [19]

Bergström

[11] Patent Number: 4,705,396
[45] Date of Patent: Nov. 10, 1987

[54] IMAGE MONOCHROMATOR

[76] Inventor: Arne Bergström, Drottninghamnsvagen 72, S-13146 Nacka, Sweden

[21] Appl. No.: 610,295
[22] PCT Filed: Aug. 30, 1983
[86] PCT No.: PCT/SE83/00307
§ 371 Date: May 2, 1984
§ 102(e) Date: May 2, 1984
[87] PCT Pub. No.: WO84/01028
PCT Pub. Date: Mar. 15, 1954

[30] Foreign Application Priority Data

Sep. 4, 1982 [GB] United Kingdom ............... 8225265

[51] Int. Cl.$^4$ ............................ G01J 3/14; G01J 3/18
[52] U.S. Cl. ..................................... 356/332; 356/334
[58] Field of Search ........ 356/300, 305, 326, 328-334, 356/328-334; 364/526; 250/458.1

[56] References Cited

U.S. PATENT DOCUMENTS

| | | | |
|---|---|---|---|
| 2,995,973 | 8/1961 | Barnes et al. | 356/331 |
| 3,575,511 | 4/1971 | Francis | 356/331 |
| 3,658,424 | 4/1972 | Elliott | 356/305 X |
| 3,664,741 | 5/1972 | Bonnet et al. | 356/305 X |
| 4,031,398 | 6/1977 | Callis et al. | 250/458.1 |
| 4,195,930 | 4/1980 | Delhaye et al. | 356/301 |
| 4,264,205 | 4/1981 | Landa | 356/326 |
| 4,455,087 | 6/1984 | Allemand et al. | 356/333 |

FOREIGN PATENT DOCUMENTS 2080947 7/1980 United Kingdom ............... 356/331

OTHER PUBLICATIONS

Johnson et al, "Video Fluorometer", American Institute of Physics, Rev. Sci. Instrum., 50(1), Jan. 1979, pp. 118-129.
Olesik and Hieftje, "Optical Imaging Spectrometers", Analytical Chemistry, vol. 57—pp. 2049-2055 (1985).
Letter (dated Feb. 24, 1986), from Dr. Gary H. Hieftje, author of above article.

Primary Examiner—Vincent P. McGraw
Attorney, Agent, or Firm—Fisher, Christen & Sabol

[57] ABSTRACT

An image monochromator is arranged to receive light at an input thereof simultaneously from an entire object field to be viewed and to produce and transmit a viewable image of the entire object field simultaneously through an output thereof at a selected wavelength band. The monochromator has inner and outer optical systems, the inner system comprising an input slit which is projected on an output slit through imaging means such as lenses or mirrors, via dispersive means such as a diffraction grating or prism operable to transmit light at a tunable narrow wavelength band. The outer optical system comprises an objective system, in which a picture of the object field is imaged on a picture plane by imaging means such as lenses or mirrors, with the input and output imaging means so arranged that the inner optical system receives and transmits to the output optical component light rays from each object point which have an angular relationship to each other within a range from slightly divergent to slightly convergent.

11 Claims, 5 Drawing Figures

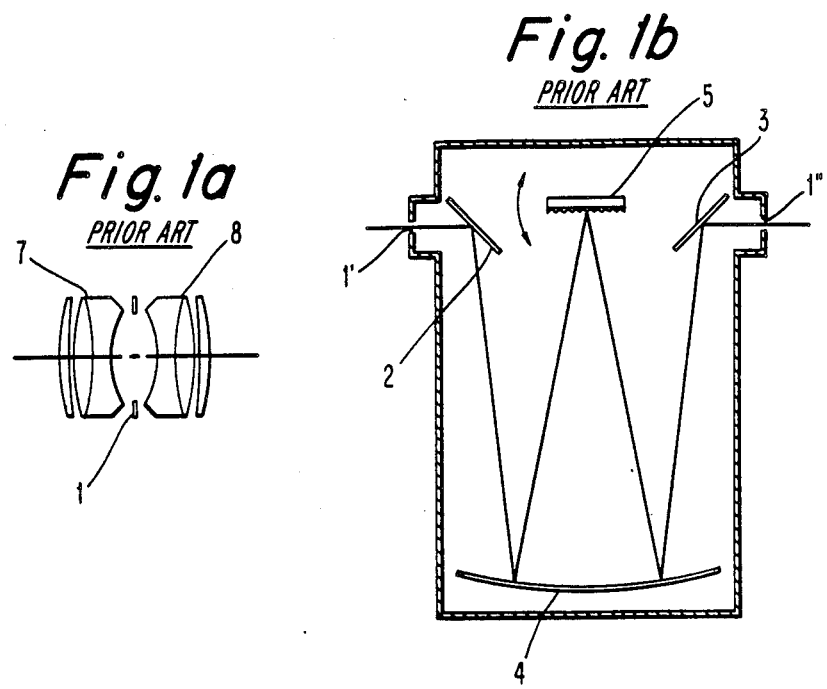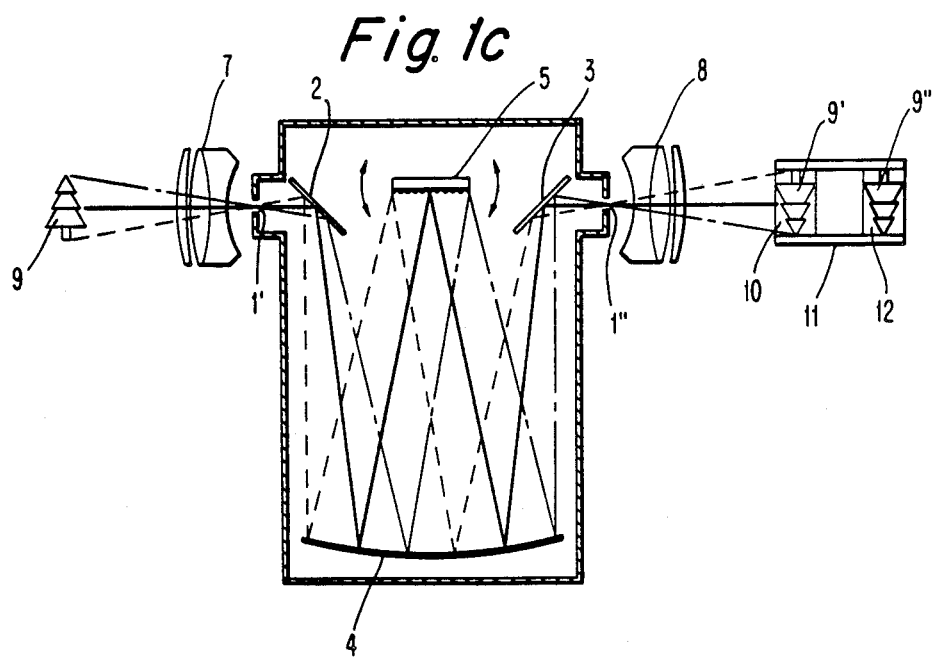

IMAGE MONOCHROMATOR

FIELD OF THE INVENTION

The present invention relates to an image monochromator, by which is meant an instrument which is capable of producing a picture by selecting light in one narrow wavelength band only for the imaging process. The invention is concerned with the provision of such an image monochromator which can give a view as seen in essentially only one spectral line and which can be used, for instance, in fluorescent analysis to obtain a picture of the spatial distribution of a particular substance on a test surface, or in plasma diagnostics, as a simple alternative to the classical spectroheliograph.

BACKGROUND ART

The spectroheliograph, as invented by George Ellery Hale in 1891, is an instrument which consists, essentially, of a prism between synchronously moving input and output slits. By means of, say, a telescopic lens, an image of an object to be studied is projected onto the plane of the moving input slit and an image is produced in turn on a photographic plate immediately beyond the moving output slit. As the input slit moves over the image projected by the telescopic lens, a picture is produced by the co-moving output slit at a narrow wavelength band determined by the positioning of the output slit relative to the input slit and the prism. In the spectrohelioscope, a modification of the spectroheliograph developed by Hale in 1924 but originally suggested by C. A. Young in 1870, an image for direct viewing is produced by rapidly oscillating the images of the slits, usually by means of two synchronously rotating prisms, so that the impression of a static picture is given to the eye.

Also known are image quality interference filters which are frequently employed in various applications to produce pictures in predetermined, narrow wavelength bands. Interference filters are of special interest in applications where the mechanical complexity of the spectroheliograph cannot be justified.

British Patent Specification No. 1,577,198 describes a system for microscopic analysis which utilises a monochromator with gratings. However, the object plane is imaged on the gratings and this is disadvantageous since imperfections, dust particles etc. on the gratings will show up in the final picture.

DISCLOSURE OF THE INVENTION

An object of the present invention is to provide an image monochromator which is mechanically simpler than the conventional spectroheliograph and which can be used to produce good quality pictures in a very narrow band with the possibility of allowing for tuning over a wide spectral range, in contrast to the fixed wavelength band of conventional interference filters.

According to the invention therefore is provided an image monochromator arranged to receive light at an input thereof simultaneously from an entire object field to be viewed and to transmit a viewable image of the entire object field simultaneously through an output thereof at a selected wavelength band, said monochromator having inner and outer optical systems, said inner system comprising an input slit which is projected on an output slit through imaging means (lenses or mirrors) and via a dispersive means (such as a diffraction grating or prism) operable to transmit light at a tunable narrow wavelength band, and said outer optical system comprising an objective system, in which a picture of the object field is imaged on a picture plane by imaging means (lenses or mirrors), characterised in that the inner optical system is inserted within the objective system so that said dispersive means receives slightly divergent to convergent rays from each object point. To compensate for the small radiance in the selected narrow band under terrestial conditions the optical system may incorporate an image intensifier.

With the monochromator of the invention a good quality picture of an entire object field to be viewed can be produced at a narrow selected wave band in a particularly simple manner.

The means used with the instrument of the invention for the selection of the desired wave band may be of customary design in that it comprises a lens or mirror system (preferably a mirror system to increase the usable wavelength region) which images said input on the output (which input and output means preferably comprise slits) via a dispersive means in the form of a prism or grating (preferably a diffraction grating also to increase usable wavelength region). With this arrangement the image of the input slit is projected as a spectrum on the output slit plane, and, by selection of the position of the output slit it is possible to select a small, specified wavelength band, the centre wavelength of which can be varied by shifting the slit or dispersive means. This arrangement corresponds to a classical form of monochromator and can be considered as an optical system which images the input slit on the output slit and at the same time selects a narrow wavelength band. For such a monochromator can be replaced in equivalent terms, if viewed as an element in a larger system, by a simple slit through which only one wavelength band passes.

Consider now, by way of illustration, an optical imaging system of the kind used as a conventional camera objective. In order to select the central rays, which produce a more exact picture, a circular aperture stop (usually an iris diaphragm) is fitted in the optical system, usually in such a way that the optical system is essentially symmetrical with respect to the plane of the aperture stop. The image monochromator of the invention can be considered, in equivalent terms, by changing this conventional objective system in two steps: first replacing the circular aperture stop by a narrow slit, then replacing this narrow slit by a classical form of monochromator as discussed above.

In the invention there are two imaging systems. Firstly, there is the outer imaging system in which, like in an ordinary camera objective, the rays from the outside world are collected by a lens and then, after selecting the centremost rays (as defined by the slits), these are imaged for example in the form of a picture on a photographic film, image intensifier tube or the like. Secondly, there is the further inner imaging system which images the rays incident on the input slit on the output slit, in this process accepting only a narrow wavelength band.

The inner imaging system is incorporated into the outer imaging system so that the rays reaching the dispersive means are slightly out of focus, the actual degree of divergency or convergency being selected as a compromise between, on the one hand:

1. vignetting, i.e. light loss towards the edges of the picture, which occurs when the outer imaging system is arranged so that light rays, which emerge from one and the same object point, are convergent or divergent to a substantial degree where the inner imaging system is inserted; and on the other hand:

2. deterioration of picture quality due to imperfections, dust etc. on the diffraction grating which occurs when the outer imaging system is arranged so that light rays, which emerge from one and the same object point, are parallel where the inner optical system is inserted (since this case can be seen to correspond to imaging the object plane on the grating)

Experience shows that there is a considerable range within which neither effect is noticeable. In other words, it can be said that the inner optical system receives light rays from each object point which have an angular relationship to each other within a range from slightly divergent to slightly convergent.

Due to the use of a dispersive means such as a diffraction grating or prism it is possible to select a required narrow wavelength band with great precision, as is the case with the classical spectroheliograph. Yet at the same time an overall picture of the object field to be viewed can be produced without requiring a mechanically complex construction, in so far as light from the entire object field is processed simultaneously due to the use of the objective system which has its input slit in the plane of the aperture stop in contradistinction to the classical spectroheliograph which, when used with a telescopic input objective, has its input slit at the picture plane (the plane of the field stop) and is therefore capable of processing light from only part of the objective field at any one time.

As explained, the image monochromator of the present invention can be constructed as a much simpler mechanical instrument than the spectroheliograph having synchronously moving slits. Common to both designs, however, the crucial problem when using a narrow wavelength band of the order of Ångströms is that the radiance in this band—in terrestial applications as compared with solar studies—is very low. The advent of modern image intensifier tubes makes it possible to use the image monochromator of the invention for a wide range of applications. A slit reduces the light intensity essentially in one direction only, and in the case of an assumed monochromator according to the invention having say, a 0.1 mm slit and a 1 cm diameter lens, the light reduction by the slit is of the order of 1/100. Assuming also, for simplicity, a 3 Å narrow band out of rectangular 3000 Å broad total spectrum, i.e. a reduction of another factor of 1/1000, the overall light reduction in the assumed monochromator is the order of 1/100,000. Image intensifier tubes with gains of the order of 100,000 are now available, and which can thus match the light reduction in such a monochromator. It should, however, be noted that an aperture of the order of f/3.5 is sufficient for a hand-held image monochromator for direct viewing in normal outdoor light.

BRIEF DESCRIPTION OF THE DRAWINGS

The present invention will now be described further by way of example only and with reference to the accompanying drawings in which:

FIG. 1a shows, in axial section, a conventional objective lens system;

FIG. 1b shows, in axial section, a conventional form of monochromator;

FIG. 1c shows, in axial section, one form of an image monochromator according to the invention.

BEST MODE OF CARRYING OUT THE INVENTION

Figure 1D:
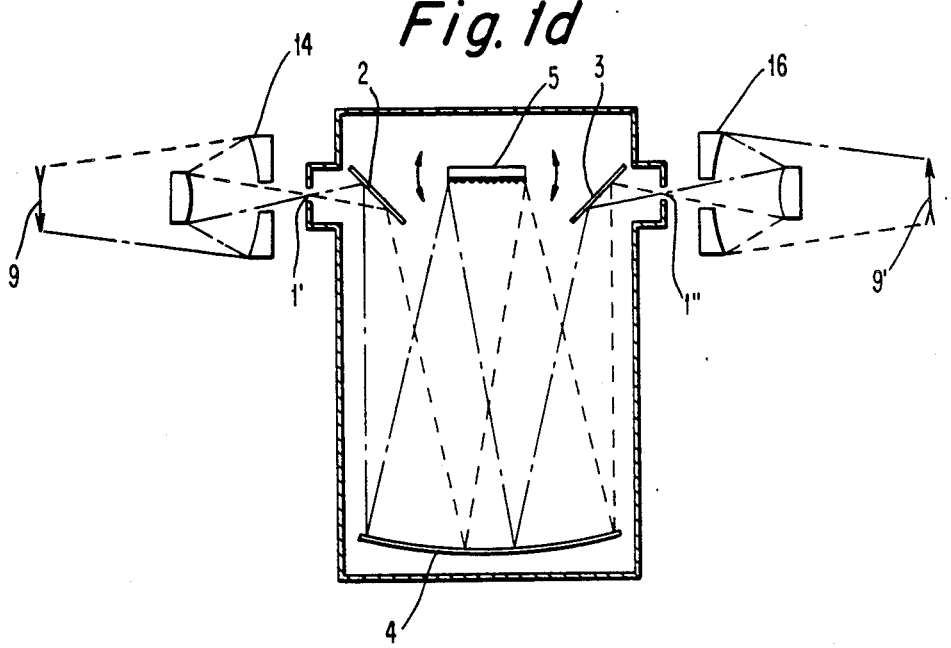
FIG. 1d shows, in axial section, a form of an image monochromator according to the invention in which mirrors are used in place of lenses in the input and output components of the objective system.

A conventional optical objective, for example, a planar objective as shown in FIG. 1a, is usually essentially symmetrical about the plane of the aperture stop 1.

FIG. 1b shows an Ebert monochromator having an input slit 1' which is projected on an output slit 1" by means of two plane mirrors 2 and 3 and a concave mirror 4, in addition to a diffraction grating 5 by which a specified wavelength can be selected, and with which in conventional manner, it is possible to vary the selected central wavelength and the band width about such wavelength in smooth continuous manner. For example, a mechanism, such as a sine bar driven by a micrometer screw, may be provided for turning the grating for tuning purposes.

The bandwidth at the slit 1" may be very narrow, say of the order of 1 nm, and this can be adjusted by adjustment of the slit width.

The image monochromator of FIG. 1c is obtained by inserting the monochromator of FIG. 1b in the aperture stop plane 1 of the objective of FIG. 1a.

Light from an object to be viewed is transmitted to input slit 1' via the pertaining part (input lenses 7) of the objective system and it will be noted that light from the entire object field is collimated and transmitted simultaneously through such slit. At the output slit 1" light in a single narrow wave band, as determined by the setting of the grating 5 (which can be rotated for tuning), is presented to the other pertaining part (output lenses 8) of the objective system and it will be noted that this light is also derived from the entire object field so that image of the entire object field can be viewed simultaneously through the latter said objective part.

The image is slightly out of focus on the grating 5 as hereinbefore discussed.

Optionally, as described above, an image intensifier tube can be used to compensate for reduction of light intensity in the monochromator. As shown in FIG. 1c, an image 9' is formed on input window 10 of image intensifier tube 11 and an intensified image 9" is formed on output window 12.

The invention is not of course intended to be restricted to the details of the above embodiment which are described by way of example only. Thus, for example, the image monochromator can be incorporated as part of a microscope system to be used, e.g. in microscopic fluorescent analysis, providing a highly selective means to study the spatial distribution of chemical substances in, say, a tissue sample.

Figure 1E:
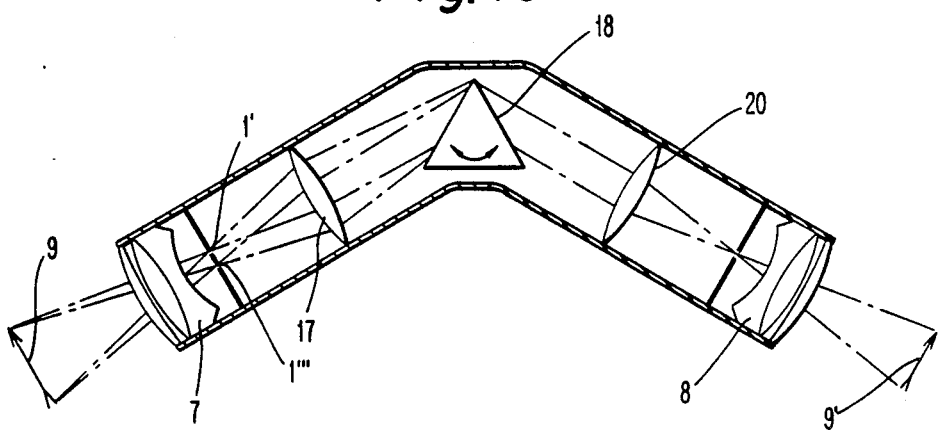
FIG. 1e shows, in axial section, a form of an image monochromator according to the invention in which a prism is used rather than a grating for dispersive means and light from the object is focused through two input slits so as to form a superimposed image in two colors.

As discussed above, various arrangements of mirrors and lenses can be used in the input and output sections of the objective system of FIG. 1c. As shown in FIG. 1d, input mirror system 14 and output mirror system 16 can be used in place of input lenses 7 and output lenses 8. It is also possible to employ several output slits in the monochromator of the invention to produce simultaneous images in more than one wavelength band. As shown in FIG. 1e, light from an object 9 to be viewed is transmitted via input lenses 7 to two input slits, 1' and 1''', and thence through an inner lens input system 17 to rotatable prism 18 for tuning (used as an alternative to grating 5). The resulting images in two wavelength bands are focused by inner output lens system 20 to pass through output slit 1'' and output lenses 8 of the objective system to form two superimposed objects 9' and 9'' which are selected from two wavelength bands and are thus different colors. These images can then be separated in the picture either by their real colours, or by using electro-optical shutters at each slit to be opened alternately in rapid succession and synchronously with a change of the video signal to corresponding colours (which then may be chosen to enhance the differences between the spectral images).

It is also to be understood that the invention is not limited to the visible region of the spectrum but may, with adequate detectors, be used also in e.g. the infrared region.

I claim:

1. An image monochromator comprising: an outer objective optical system with input and output optical imaging components which together form said objective system, said outer objective system being arranged:
   a) to receive light from an object field to be viewed, and
   b) to produce a viewable image of said object field on a picture plane;
   an inner optical system interposed between said optical imaging components to transmit light between said optical imaging components at a selected tunable narrow wavelength band, whereby said viewable image is produced as a monochromatic image;
   said inner system comprising an input slit to receive light from said input optical imaging component, imaging means arranged to project an image of the input slit on an output slit, and tunable dispersive means between said input and output slits;
   and said input and output optical imaging components being arranged such that said inner optical system receives at said input slit light rays from each object point which have an angular relationship to each other within a range from slightly divergent to slightly convergent
   whereby the said monochromatic image which is produced is of the entire said object field.

2. A monochromator according to claim 1, wherein said optical system incorporates an image intensifier.

3. An image monochronomator according to claim 1 wherein there are two or more slits in the inner optical system so that two or more wavelength bands can be continuously selected, and imaged simultaneously or intermittently.

4. An image monochromator according to claim 1, wherein said imaging means of said inner optical system comprises a plurality of lenses.

5. An image monochromator according to claim 1, wherein said imaging means of said inner optical system comprises a plurality of mirrors.

6. An image monochromator according to claim 1, wherein said tunable dispersive means comprises a single diffraction grating.

7. An image monochromator according to claim 1 wherein siad tunable dispersive means comprises at least one prism.

8. An image monochromator according to claim 1, wherein said input and output optical imaging components comprise a plurality of lenses.

9. An image monochromator according to claim 1, wherein said input and output optical imaging components comprise a plurality of mirrors.

10. An image monochromator according to claim 3 wherein the corresponding pictures are distinguished from each other by being displayed in different colors.

11. An image monochromator comprising: an outer objective optical system comprising input and output optical imaging lens components which together form said objective system, said outer system being arranged:
    a) to receive light from an object field to be viewed and,
    b) to produce a viewable image of said object field on a picture plane;
    an inner optical system interposed between said input and output lens components to transmit light between said components at a selected tunable narrow wavelength band, whereby said viewable image is produced as a monochromatic image;
    said inner system comprising an input slit to receive light from said input optical imaging lens component, an output slit to supply light to said output optical imaging lens component, a mirror system arranged to project an image of the input slit on the output slit, and tunable dispersive means comprising a diffraction grating and optically aligned between said input and output slits;
    said input and output optical imaging lenses being arranged such that said inner optical system receives and transmits to said output lenses light rays from each object point which have an angular relationship to each other within a range from slightly divergent to slightly convergent.

* * * * *